(12) United States Patent
Tanno et al.

(10) Patent No.: US 12,153,942 B2
(45) Date of Patent: Nov. 26, 2024

(54) INPUT VALUE SETTING ASSISTING APPARATUS, INPUT VALUE SETTING ASSISTING METHOD AND PROGRAM

(71) Applicant: NIPPON TELEGRAPH AND TELEPHONE CORPORATION, Tokyo (JP)

(72) Inventors: Haruto Tanno, Tokyo (JP); Hiroyuki Kirinuki, Tokyo (JP); Toshiyuki Kurabayashi, Tokyo (JP); Yu Yoshimura, Tokyo (JP); Yu Adachi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 150 days.

(21) Appl. No.: 17/601,892

(22) PCT Filed: Mar. 27, 2020

(86) PCT No.: PCT/JP2020/013960
§ 371 (c)(1),
(2) Date: Oct. 6, 2021

(87) PCT Pub. No.: WO2020/209098
PCT Pub. Date: Oct. 15, 2020

(65) Prior Publication Data
US 2022/0206828 A1 Jun. 30, 2022

(30) Foreign Application Priority Data
Apr. 10, 2019 (JP) .................... 2019-074723

(51) Int. Cl.
*G06F 9/451* (2018.01)
*G06F 3/0484* (2022.01)

(52) U.S. Cl.
CPC ............ *G06F 9/453* (2018.02); *G06F 3/0484* (2013.01)

(58) Field of Classification Search
CPC .... G06F 9/453; G06F 3/0481; G06F 3/04847; G06F 3/0484; G06F 3/0482; G06F 3/04817
See application file for complete search history.

(56) References Cited

U.S. PATENT DOCUMENTS 6,061,516 A * 5/2000 Yoshikawa ............. G06F 9/451
717/109
8,191,152 B1 * 5/2012 Barker .................... G06Q 40/00
704/244

(Continued)

FOREIGN PATENT DOCUMENTS

JP  2014199603 A  10/2014

OTHER PUBLICATIONS

Kurabayashi et al. (2017) "Automatic Test Script Generation on GUI Testing" Software Engineering Symposium 2017 Proceedings, pp. 260-264.

(Continued)

*Primary Examiner* — Tadesse Hailu

(57) ABSTRACT

An input value setting assistance device includes: an acquisition unit that displays a first screen including a plurality of input fields, and acquires an image of the first screen and a coordinate value regarding each of the input fields included is the first screen; and an assistance unit that displays a second screen including the image acquired by the acquisition unit regarding the first screen and setting fields for setting values for each of the input fields of the first screen and, when one of the setting fields is selected, displays a prescribed mark based on the coordinate value acquired by the acquisition unit for the input field related to the setting field. Thereby, the setting work of each of the input values (Continued)

prepared in advance for each of the input fields included is the screen can be effectively assisted.

18 Claims, 10 Drawing Sheets

(56) References Cited

U.S. PATENT DOCUMENTS

| | | | | |
|---|---|---|---|---|
| 8,793,118 | B2* | 7/2014 | Srinivasa | G09B 21/009 |
| | | | | 704/2 |
| 9,032,067 | B2* | 5/2015 | Prasad | G06Q 30/02 |
| | | | | 717/124 |
| 9,916,626 | B2* | 3/2018 | Huang | G06T 7/00 |
| 10,698,557 | B2* | 6/2020 | Hey | G06F 11/3672 |
| 10,750,044 | B2* | 8/2020 | Hayashi | G06F 9/4405 |
| 11,176,621 | B1* | 11/2021 | McDonald | G06Q 40/123 |
| 11,461,689 | B2* | 10/2022 | Petursson | G06V 30/413 |
| 2004/0060039 | A1* | 3/2004 | Fujikawa | G06F 11/3672 |
| | | | | 717/124 |
| 2004/0205570 | A1* | 10/2004 | Tonomura | G06F 16/972 |
| | | | | 707/E17.117 |
| 2006/0085681 | A1* | 4/2006 | Feldstein | G06F 11/3692 |
| | | | | 714/25 |
| 2011/0078556 | A1* | 3/2011 | Prasad | G06F 9/451 |
| | | | | 707/E17.108 |
| 2012/0109931 | A1* | 5/2012 | Prasad | G06F 11/3672 |
| | | | | 707/E17.108 |
| 2013/0226952 | A1* | 8/2013 | Lal | G06F 40/143 |
| | | | | 707/767 |
| 2014/0189576 | A1* | 7/2014 | Carmi | G06V 10/757 |
| | | | | 715/781 |
| 2016/0147379 | A1* | 5/2016 | Iwata | G06F 9/453 |
| | | | | 715/802 |
| 2018/0197103 | A1* | 7/2018 | Petursson | G06N 20/00 |
| 2019/0384699 | A1* | 12/2019 | Arbon | G06N 3/006 |
| 2021/0390011 | A1* | 12/2021 | Cser | G06F 9/451 |

OTHER PUBLICATIONS

Kurabayashi et al. (2018) "A Proposal of Input Value Creation Support Technique for Automatic Generation of Test Scripts" IPSJ SIG Technical Reports, vol. 2018-SE-199, No. 13, pp. 1-7.

* cited by examiner

—Prior Art—

Fig. 2
—Prior Art—

EMPLOYEE INFORMATION SEARCH (g7)

DEPARTMENT NAME:

POSITION:

NAME:

SEARCH

DESCRIPTION ON HTML

DEPARTMENT NAME `<input type="text" id="department" />`

POSITION `<input type="text" id="position" />`

NAME `<input type="text" id="name" />`

Fig. 3

—Prior Art—

(a)
```
- EMPLOYEE INFORMATION SEARCH
      (URL:http://xxx/yyy)
    - id: department
       - value:
    - id: position
       - value:
    - id: name
       - value:
```

(b)
```
- EMPLOYEE INFORMATION SEARCH
      (URL:http://xxx/yyy)
    - id: department
       - value: SALES DEPARTMENT
    - id: position
       - value: CHIEF
    - id: name
       - value: TARO YAMADA
```

Fig. 8

EMPLOYEE INFORMATION SEARCH (URL:http://xxx//yyy) 510

EMPLOYEE INFORMATION SEARCH 511

DEPARTMENT NAME:
POSITION:
NAME:

SEARCH

| No. | id | INPUT VALUE |
|---|---|---|
| 1 | department | |
| 2 | position | |
| 3 | name | |

512

REGISTRATION BUTTON 513

Fig. 9

| No. | id | INPUT VALUE |
|---|---|---|
| 1 | department | |
| 2 | position | |
| 3 | name | |

EMPLOYEE INFORMATION SEARCH (URL:http://xxx//yyy)

EMPLOYEE INFORMATION SEARCH

DEPARTMENT NAME:
POSITION:
NAME:

SEARCH

REGISTRATION BUTTON

Fig. 10

EMPLOYEE INFORMATION SEARCH (URL:http://xxx//yyy)

510

511

EMPLOYEE INFORMATION SEARCH

DEPARTMENT NAME:
POSITION:
NAME:

SEARCH

SCREENSHOT

512

| No. | id | INPUT VALUE | ATTRIBUTE 1 (required ATTRIBUTE) | ATTRIBUTE 2 (......ATTRIBUTE) |
|-----|-----------|-------------|----------------------------------|-------------------------------|
| 1   | department |             | NONE                             | ...                           |
| 2   | position   |             | NONE                             | ...                           |
| 3   | name       |             | NONE                             | ...                           |

513

REGISTRATION BUTTON

514

| No. | id | INPUT VALUE SET 1 | INPUT VALUE SET 2 | ... |
|-----|-----------|-------------------|-------------------|-----|
| 1   | department | SALES SECTION     | LEGAL SECTION     | ... |
| 2   | position   | SECTION MANAGER   | GENERAL MANAGER   | ... |
| 3   | name       | YAMADA            | KAWADA            | ... |

INPUT VALUE SETTING ASSISTING APPARATUS, INPUT VALUE SETTING ASSISTING METHOD AND PROGRAM

CROSS-REFERENCE TO RELATED APPLICATIONS

This application is a U.S. 371 Application of International Patent Application No. PCT/JP2020/013960, filed on 27 Mar. 2020, which application claims priority to and the benefit of JP Application No. 2019-074723, filed on 10 Apr. 2019, the disclosures of which are hereby incorporated herein by reference in their entireties.

TECHNICAL FIELD

The present invention relates to an input value setting assistance device, an input value setting assistance method, and a program.

BACKGROUND ART

In order to promptly provide a service suited for diversifying consumer needs, recently, there is an increasing style of development with which software development is carried out in a short cycle to release a service frequently. For providing a service in a short cycle, frequency for performing a software test for checking whether software operates properly is increased as well.

In a software test, a function test is performed for checking whether or not a Web application (hereinafter, simply referred to as "Web app") as a test target operates as intended by its designer. In the function test, it is concerned that a vast amount of time is required for a test (hereinafter, referred to as "screen transition test") related to a screen transition (transition of Web pages). Herein, the screen transition test is defined as "a test for checking whether or not a Web app is mounted as per specification from a screen displayed on a client side for an interaction from the client side".

The screen transition test takes time because it is required to do manual operations such as click operations of links and buttons on the screen, inputting appropriate values to input forms, and the like as interactions from the client side. Those operations are repeatedly performed on all screens, so that a vast amount of time is required. Therefore, it is desired to implement labor saving.

As a method for reducing the time required for the screen transition test, there is known a method that automatically executes the screen transition test by writing a test case in a script. However, since it takes time also for the work itself for generating a test script, it is considered that the work time efficiency does not come to an effect unless the automatic test using the generated test script is performed three or more times. Further, when there is a change applied to the existing function, the generated test script becomes unusable. Thus, it is necessary to regenerate the test script every time there is a change in the specifications.

In order to overcome such issues, there has been devised a reverse-based test script automatic generation technique (hereinafter, referred to as "reverse-based test technique") that restores specifications information by analyzing a Web application as the test target and automatically generates a test script from information of the restored specifications (see Non-Patent Literature 1).

CITATION LIST

Non-Patent Literature

Non-Patent Literature 1: T. Kurabayashi, M. Iyama, H. Kirinuki, H. Tanno, "Automatic Test Script Generation on GUI Testing", Software Engineering Symposium 2017, Transactions pp. 260-264, September 2017

Non-Patent Literature 2: T. Kurabayashi, H. Kirinuki, H. Tanno, "A Proposal of Input Value Creation Support Technique for Automatic Generation of Test Scripts", Information Processing Society of Japan, Technical Report Software Engineering, vol. 2018-SE-199, no. 13, pp. 1-7, July 2018

SUMMARY OF THE INVENTION

Technical Problem

With the reverse-based test technique, it is possible to automatically generate a test script that is capable of covering, without going through many steps, screen transitions for the test target configured only with hyperlinks and buttons. However, in a case where a specific input value is required, such as a login screen, crawling (acquiring a screen as transition destination) is difficult. Thus, in a case where a specific input value is required, it is necessary to prepare the input value in advance manually and give it to a crawler. Preparing the input value in advance manually and giving it to the crawler is called "screen input value assistance". In order to achieve screen input value assistance, it is necessary for a tester to find all input forms and then set the input values to each of corresponding input forms.

Non-Patent Literature 2 discloses a technique that is capable of setting in advance input values that correspond to each of the input forms. Specifically, it is assumed that there is a Web app that performs screen transition as in FIG. 1, for example. In FIG. 1, screens g1 to g16 are illustrated as transition destinations. Each of the screens is expressed with HTML (HyperText Markup Language), for example. In FIG. 2, an example of description of HTML on the screen g7 is illustrated. As can be seen in HTML illustrated therein, an ID and the like (id attribute of input element) of an input form of each of the screens is included in HTML of each of the screens. With the technique disclosed in Non-Patent Literature 2, after crawling, text data as a screen input value entry format as in FIG. 3(*a*) is output for each of transition-destination screens. FIG. 3(*a*) illustrates the screen input value entry format for the screen g7 of FIG. 2. In addition to the title and URL of the screen g7, the screen input value entry format includes a row for allowing the user to input the value (row of "–Value:", which is referred to as "input row" hereinafter) for each ID of each input form of the screen g7. Therefore, when the user adds the input value to each input row of the screen input value entry format, the screen input value entry format is updated as in FIG. 3(*b*).

This existing method has such a shortcoming that, in the screen input value entry format, it is hard for the user to grasp which of the input forms of actual screen corresponds to each input row. While the user may be able to guess the input form that corresponds to the input row somehow by referring to an ID character string such as "id: department" as in the example of FIG. 3, it is just a guess and lacks accuracy.

Depending on the mounted Web app, the ID in each input form may not be a character string indicating any meanings. In that case, in order to accurately know which input form of which screen corresponds to each input row of the screen input value entry format, it is necessary to actually operate the Web app, transit to the target screen manually, and check the screen ID of the input form to be the target of the input value assistance on the screen by using a tool attached to a Web browser. However, it takes time and effort.

Further, while it may be possible to guess the information (for example, a text such as "department name" on HTML in FIG. 2) corresponding to the input form from surrounding elements, texts, and the like of the input form in a DOM tree of HTML, it is just a guess and lacks accuracy.

The present invention is designed in view of the foregoing issues, and it is an object thereof to efficiently assist setting work of each input value prepared in advance for each input field included in a screen.

Means for Solving the Problem

In order to overcome the foregoing issue, the input value setting assistance device includes: an acquisition unit that displays a first screen including a plurality of input fields, and acquires an image of the first screen and a coordinate value regarding each of the input fields included in the first screen; and an assistance unit that displays a second screen including the image acquired by the acquisition unit regarding the first screen and setting fields for setting values for each of the input fields of the first screen and, when one of the setting fields is selected, displays a prescribed mark based on the coordinate value acquired by the acquisition unit for the input field related to the setting field.

Effects of the Invention

It is possible to efficiently assist setting work of each input value prepared in advance for each input field included in a screen.

BRIEF DESCRIPTION OF DRAWINGS

FIG. 2 is a diagram illustrating an example of description using HTML.

FIG. 3 illustrates diagrams for describing a screen input value entry format.

FIG. 8 is a diagram it a display example of a setting assistance screen.

FIG. 9 is a diagram illustrating a display example of a mark.

FIG. 10 is a diagram illustrating a second display example of the setting assistance screen.

DESCRIPTION OF EMBODIMENTS

Hereinafter, an embodiment of the present invention will be described with reference to the accompanying drawings.

Figure 4:
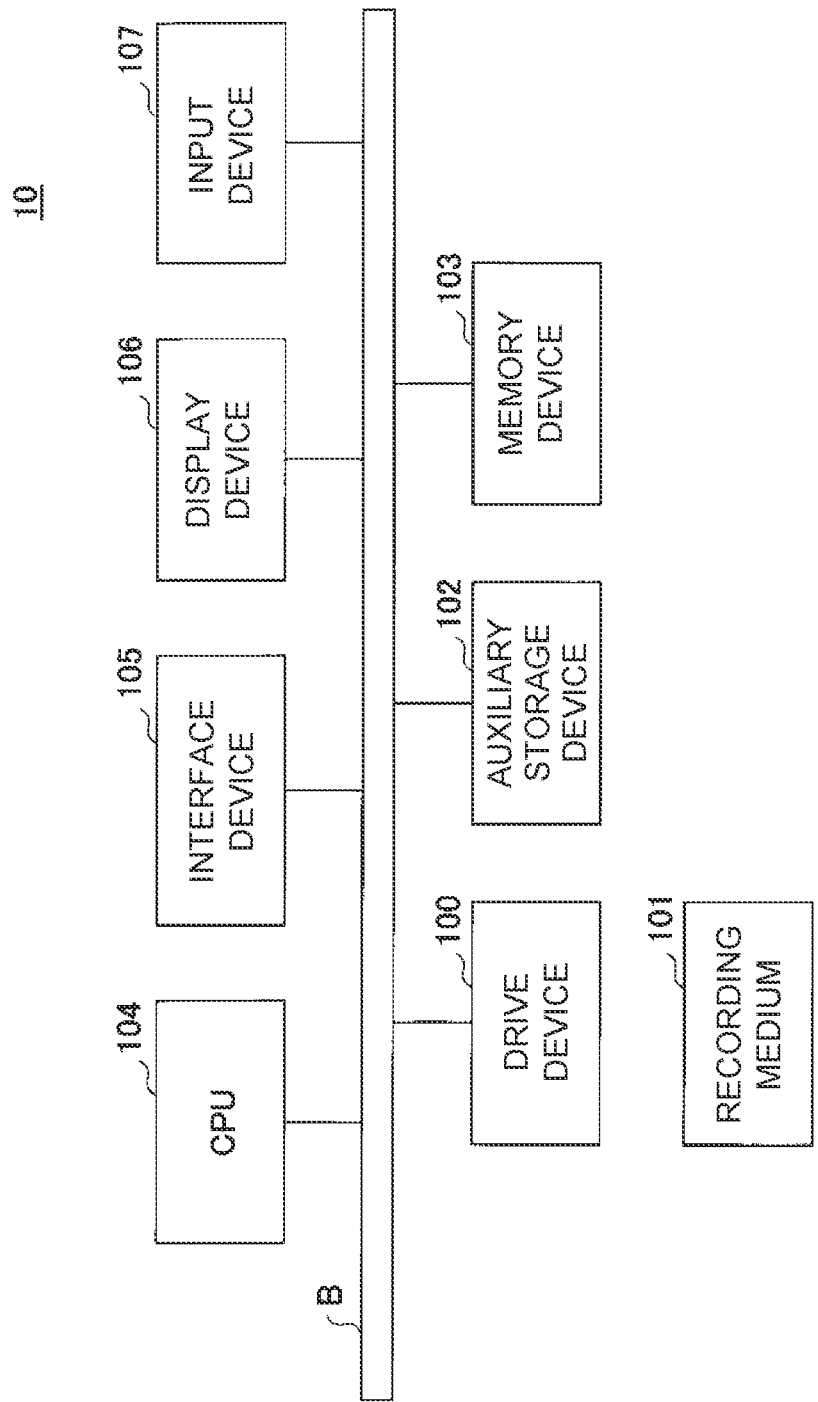
FIG. 4 is a diagram illustrating an example of a hardware configuration of an input value setting assistance device 10 according to an embodiment of the present invention.

FIG. 4 is a diagram illustrating an example of a hardware configuration of an input value setting assistance device 10 according to the embodiment of the present invention. The input value setting assistance device 10 of FIG. 4 includes a drive device 100, an auxiliary storage device 102, a memory device 103, a CPU 104, an interface device 105, a display device 106, an input device 107, and the like, which are connected to each other via a bus B.

A program implementing the processing executed in the input value setting assistance device 10 is provided by a recording medium 101 such as a CD-ROM. When the recording medium 101 to which the program is stored is set to the drive device 100, the program is installed to the auxiliary storage device 102 from the recording medium 101 via the drive device 100. Note, however, that the program may not necessarily have to be installed via the recording medium 101 but may be downloaded from another computer via a network. The auxiliary storage device 102 stores the installed programs and also stores necessary files, data, and the like.

The memory device 103 reads out and stores the program from the auxiliary storage device 102, when there is an instruction to start the program. The CPU 104 implements the function related to the input value setting assistance device 10 according to the program, stored in the memory device 103. The interface device 105 is used as an interface for connecting to a network. The display device 106 displays GUI (Graphic User Interface) and the like by the program. The input device 107 is configured with a keyboard, a mouse, and the like, and used for inputting various operation instructions.

Figure 5:
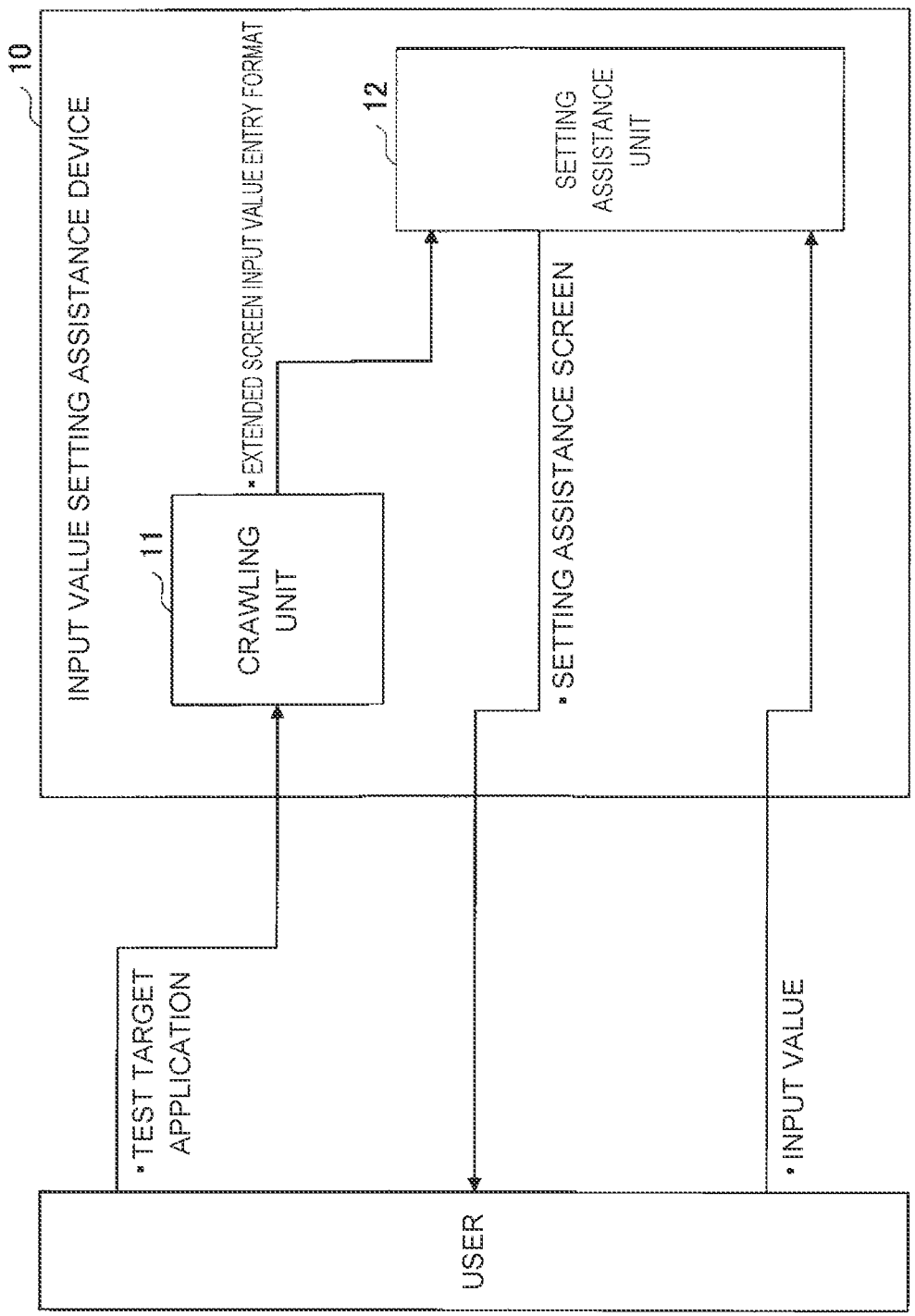
FIG. 5 is a diagram illustrating an example of a functional configuration of the input value setting assistance device 10 according to the embodiment of the present invention.

FIG. 5 is a diagram illustrating an example of the functional configuration of the input value setting assistance device 10 according to the embodiment of the present invention. In FIG. 5, the input value setting assistance device 10 includes a crawling unit 11, a setting assistance unit 12, and the like. Each of those units is implemented by the processing executed by the CPU 104 run by one or more programs installed in the input value setting assistance device 10.

The crawling unit 11 executes crawling for the Web app as the test target, and generates data (hereinafter, referred to as "extended screen input value entry format") for assisting setting of the value for the input form (input field) of the screen for each of a plurality of screens (Web pages) as transition destinations regarding the Web app.

The setting assistance unit 12 displays, on the display device 106, the screen (hereinafter, referred to as "setting assistance screen") based on the extended screen input value entry format generated by the crawling unit 11 for each of the plurality it of screens related to the Web app as the test target, receives setting of the input value for each of the input forms, and reflects (overwrites) the set input values to the extended screen input value entry format.

Figure 6:
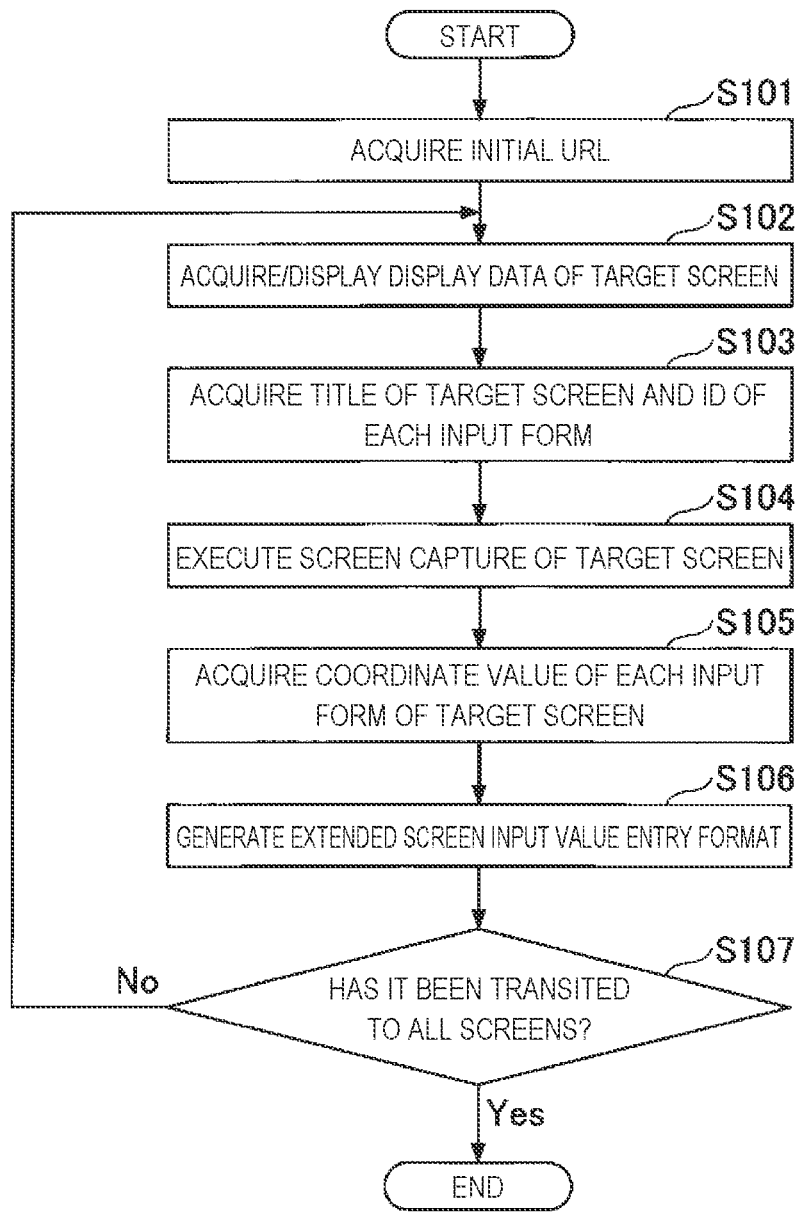
FIG. 6 is a flowchart for describing an example of a processing procedure of generation processing of an extended screen input value entry format.

Hereinafter, the processing procedure executed by the input value setting assistance device 10 will be described. FIG. 6 is a flowchart for describing an example of the processing procedure of generation processing of the extended screen input value entry format.

In step S101, the crawling unit 11 acquires an initial URL (Uniform Resource Locator) of the Web app as the test target (hereinafter, referred to as "target app"). The initial URL is a URL for a screen as a starting point from which the screen transition of the target app starts. Not that the initial URL may be input by the user at the timing of step S101 or may be stored in advance on the auxiliary storage device 102 or the like.

Subsequently, the crawling unit 11 acquires the display data (HTML data and the like) of the target screen (Web page) corresponding to the URL of the processing target (hereinafter, referred to as "target URL") by accessing to the target URL, and displays the target screen based on the display data on the display device 106 by using the Web browser (S102). Note that, in a case where step S102 is executed for the first time, the initial URL is the target URL.

Subsequently, the crawling unit 11 acquires the title of the target screen and the ID of each input form of the target screen (S103). The title and the ID can be acquired by using a known technique.

Subsequently, the crawling unit 11 executes screen capture of the target screen, and acquires image data of the target screen (hereinafter, referred to as "target-screen image") (S104). Then, the crawling unit 11 acquires a coordinate value at a prescribed position (for example, a coordinate value at the upper left vertex) of each input form of the target screen (S105). The coordinate value is a coordinate value in a coordinate system having the upper left vertex of the target-screen image as the origin, for example. Note that the coordinate value may be acquired by identifying an element corresponding to each input form in a DOM (Document Object Model) tree and making an inquiry to a tool related to the Web browser about the coordinate value corresponding to the element, for example.

Subsequently, the crawling unit 11 generates the screen input value entry format including the title of the target screen, the URL of the target screen, and the ID of each input form of the target screen, and associates the screen input value entry format with the target screen image and saves it in the auxiliary storage device 102, for example (S106). Note that the screen input value entry format may be the text data in a form illustrated in FIG. 3(a). Note here that the screen input value entry format and the target screen image as a pair are the extended screen input value entry format.

Figure 1:
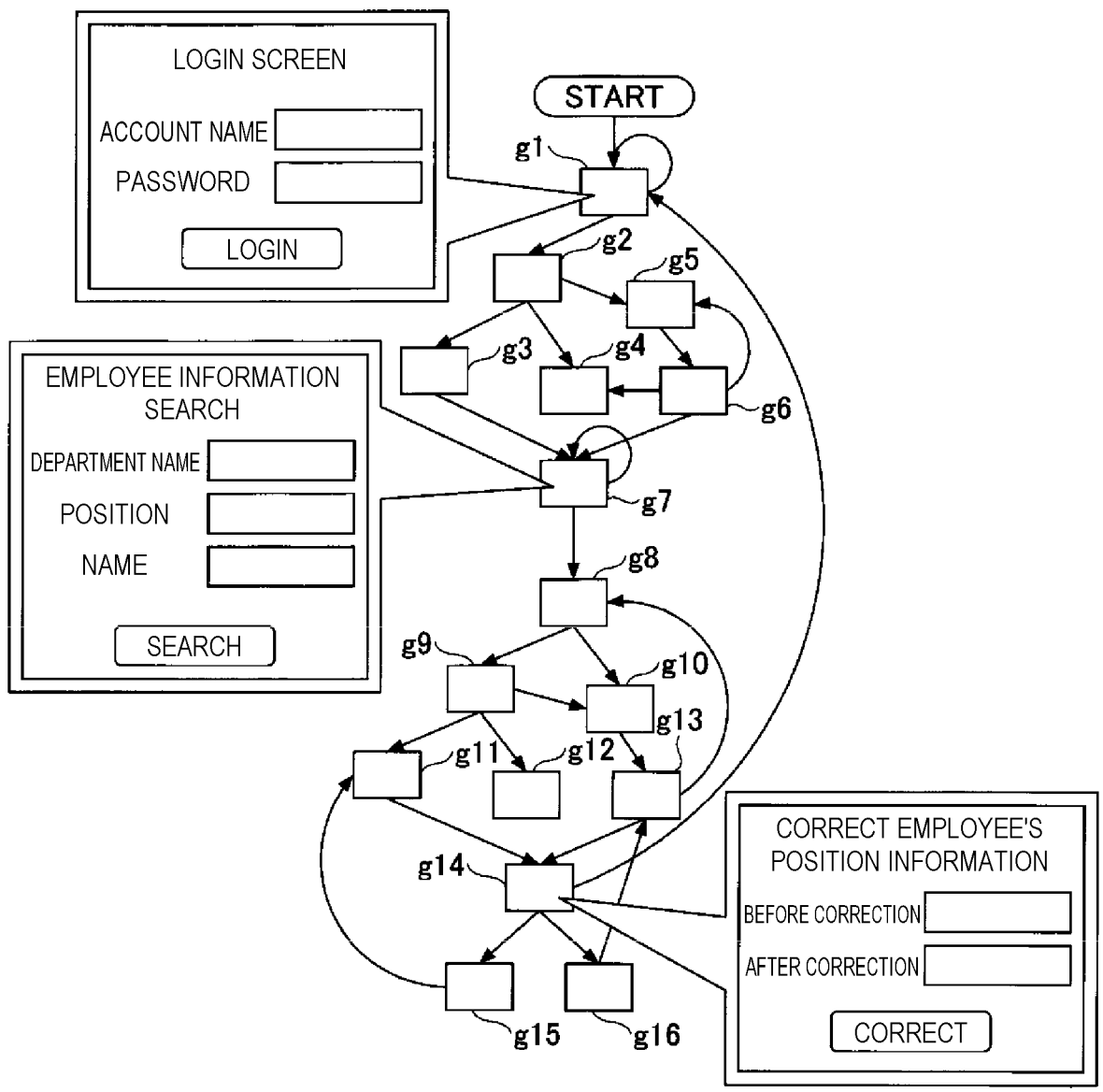
FIG. 1 is a diagram illustrating an example of screen transitions.

Step S102 and steps thereafter are executed by targeting all screens as transition destinations in regards to the target app (S107). Thus, the extended screen input value entry format is generated for each of the screens as the transition destinations. For example, when the Web app us rated in FIG. 1 is the target app, the extended screen input value entry format is generated and saved for each of the sixteen screens g1 to g16.

Figure 7:
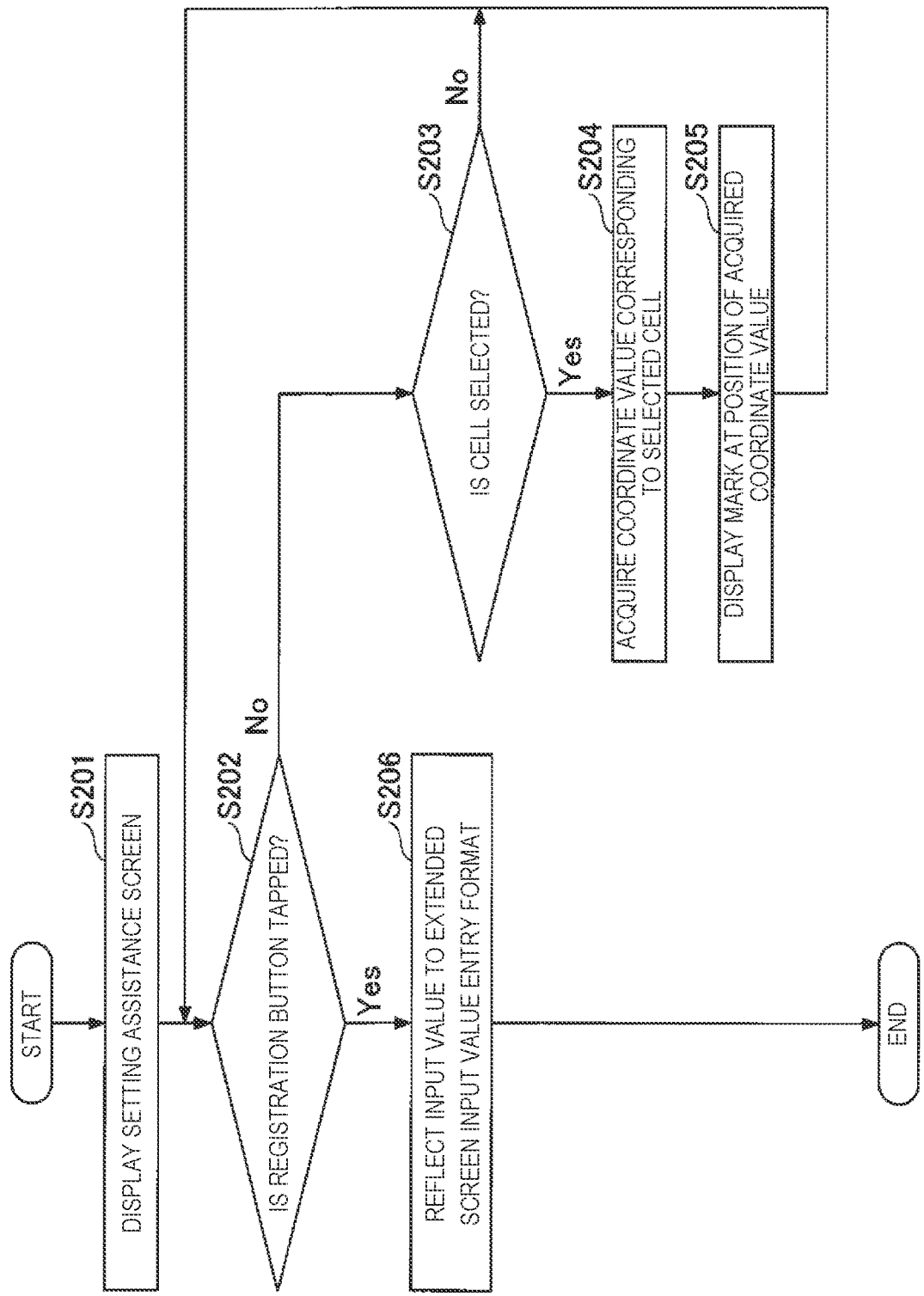
FIG. 7 is a flowchart for describing an example of a processing procedure of assistance processing for setting a value corresponding to an input form on a screen.

FIG. 7 is a flowchart for describing an example of the processing procedure of assistance processing for setting the value corresponding to the input form of the screen. The processing procedure of FIG. 7 may be executed successively (synchronously) after completing the processing procedure of FIG. 6 or may be executed at an arbitrary timing after executing the processing procedure of FIG. 6. Further, referring to FIG. 1, a case of having a certain single screen (hereinafter, referred to as "target screen") as the processing target will be described. When the screens of all transition destinations are taken as the processing targets, the processing procedure of FIG. 7 may be looped for all extended screen input value entry formats.

In step S201, the setting assistance unit 12 generates a setting assistance screen based on the extended screen input value entry format of the target screen, and displays the setting assistance screen on the display device 106.

FIG. 8 is a diagram illustrating a display example of the setting assistance screen in FIG. 8, a setting assistance screen 510 includes a screen image display field 511, an input value setting field 512, a registration button 513, and the like.

The screen image display field 511 is a field where the target screen image is displayed in an original resolution without being expanded or reduced.

The input value setting field 512 is a field for receiving setting of the input values for each of the input forms of the target screen. That is, the input value setting field 512 includes rows for each of the input forms of the target screen, and each row includes the ID (id) of the input form and a setting field (cell) of the input value. Note that the input value setting field 512 can be generated according to the extended screen input value entry format of the target screen.

The registration button 513 is a button for receiving an instruction for registering the input value input to the input value setting field 512 (for writing to the extended screen input value entry format). Note that FIG. 8 corresponds to a display example of the setting assistance screen 510 in a case where the target screen is the screen g7.

Subsequently, until the registration button 513 is tapped (S202), steps S203 to S205 are repeated every time the cell of one of the rows of the input value setting field 512 is selected. That is, when one of the cells is selected in the input value setting field 512 (Yes in S203), the setting assistance unit 12 identifies the ID of the row including the cell in the input value setting field 51 and acquires the coordinate value written in the extended screen input value entry format of the target screen in regards to the ID.

Subsequently, the setting assistance unit 12 displays a mark at the position corresponding to the coordinate value in the target screen image displayed in the screen image display field 511 (S205).

FIG. 9 is a diagram illustrating a display example of the mark. In FIG. 9, illustrated is a state where the cell of the row where the ID (id) is "department" is selected. In this state, in the target screen image displayed in the screen image display field 511, an inverted triangle mark m1 is superimposed on the target screen image at the upper left vertex of the input form of the department name. The mark m1 is the mark displayed in step S205. With the mark m1, the input form corresponding to the cell as the target for the user to input the value can become visually clear, thereby making it easy for the user to grasp for which input form of which screen the value is to be set.

Note that the shape of the mark is not limited to that illustrated in FIG. 9. Further, the display position of the mark is not limited to the upper left vertex. Furthermore, the mark may be displayed not only at one point in the input form. For example, the coordinate values of each of vertexes of a circumscribed rectangle of each input form or of the diagonal vertexes may be acquired in step S105 of FIG. 6, and the circumscribed rectangle may be displayed as a mark in step S205. Alternatively, a line or the like connecting the cell as the input target and the coordinate value of the input form corresponding to the cell may be displayed as a mark. That is, as long as the corresponding relation between the cell and the input form can be made clear, there is no specific limit set for the display mode and shape of the mark.

When the registration button 513 is tapped while the values are being input in each of the cells on all or a part of rows of the input value setting field 512 (Yes in S202), the setting assistance unit 12 reflects the values input in each of the cells to the extended screen input value entry format of the target screen as the values for the IDs corresponding to the rows including the cells (S206). As a result, the extended screen input value entry format comes to be in a state illustrated in FIG. 3(b), for example.

Note that the setting assistance screen 510 may be extended as illustrated in FIG. 10. FIG. 10 is a diagram illustrating a second display example of the setting assistance screen.

In FIG. 10, the input value setting field 512 further includes columns (columns surrounded by a broken line in the drawing) corresponding to attributes (attribute 1, attribute 2, and the like) of each input form. Those attributes are the information defined for each of the input forms within the display data (HTML data and the like) on the target screen. For example, like "required attribute", by displaying the value of the attribute indicating the restricting condition for the input value, the effect for assisting input can be increased.

Note that, in that case, the crawling unit 11 may acquire the attribute information of each of the input forms along with the 10 of each of the input forms in step S103, and generate the screen input value entry format by including the attribute information of each of the input forms in step S106.

The setting assistance screen 510 of FIG. 10 further includes an input history field 514. The input history field 514 is a field that displays the input value of each of the input forms set for each of the input forms of the target screen when FIG. 7 is executed in the past. For example, in FIG. 10, "input value set N (N=1, 2, . . . )" indicates a set of input values set for each of the input forms in the N-th time.

That is, the input value setting work for each of the input forms of each transition-destination screen may be executed a plurality of times for the same Web app as follows.

(1) First crawling
(2) First input value setting work
(3) Second crawling (executed this time is crawling of still wider range by utilizing the input values given in (2))
(4) Second input value setting work (input value is added further this time so as to be able to reach the screen that cannot be reached in (3)
(5) Third crawling . . .

Thereinafter, the above work is repeated until thoroughly covering the transition destinations.

In such a case, if the input values set in the past in each of the input forms of each screen are known, it is possible to avoid duplicating the input values set in the past in (4) and the like so that efficiency of the work can be improved.

Note that, in a case where the input history field 514 is included in the setting assistance screen 510, the history of the extended screen input value entry format generated by the input value setting work of each time may be saved. The setting assistance unit 12 may include the input history field 514 in the setting assistance screen 510 according to the history. As described above, according to the embodiment, the section to be the target for the user to set the value is visually indicated on the screen image. Therefore, the user can clearly know which input form of which screen is the target for setting the value. As a result, it is possible to effectively assist the setting work of each input value that is prepared in advance for each of the input fields included in the screen.

Note that the embodiment may be applied to applications other than the Web app. That is, the display data on each of the screens is not limited to HTML data.

In the embodiment, the crawling unit 11 is an example of an acquisition unit. The setting assistance unit 12 is an example of an assistance unit. The screen of the transition destination of the Web app is an example of a first screen. The setting assistance screen 510 is an example of a second screen.

While the embodiment of the present invention has been described above, the present invention is not limited to the specific embodiment but various modifications and changes are possible within the scope of the gist of the present invention described in the appended claims.

REFERENCE SIGNS LIST

10 Input value setting assistance device
11 Crawling unit
12 Setting assistance unit
100 Drive device
101 Recording medium
102 Auxiliary storage device
103 Memory device
104 CPU
105 Interface device
106 Display device
107 Input device
B Bus

The invention claimed is:

1. An input value setting assistance device comprising a processor configured to execute operations comprising:
displaying a first screen of an application, wherein the first screen comprises a plurality of input fields associated with the application;
acquiring an image of the first screen and a coordinate value of each input field of the plurality of input fields in the first screen, wherein the coordinate value of each input field of the plurality of input fields in the first screen is according to an instruction code of displaying said each input field of the plurality of input fields in the first screen of the application; and
displaying a second screen, wherein the second screen comprises the image and setting fields, wherein the setting fields are interactively selectable for receiving input data for setting a value associated with an input field of the plurality of input fields; and
when a setting field of the setting fields is interactively selected, display, in the second screen, a prescribed mark and an indication of the selection of the setting field,
wherein a set of the prescribed mark and the indication of the selection of the setting field represents an assistance to enter the input data in the selected setting field by indicating association between the input field and the interactively selected setting field,
the prescribed mark points to a part of the image corresponding to the acquired coordinate value of the input field of the plurality of input fields associated with the interactively selected setting field, and
the prescribed mark and the indication of the selection of the setting field are distinct.

2. The input value setting assistance device according to claim 1, wherein the displaying the prescribed mark further comprises superimposing and displaying the prescribed mark on the image displayed on the second screen.

3. The input value setting assistance device according to claim 2, wherein the displaying the prescribed mark further comprises displaying the prescribed mark at a position indicated by the coordinate value in the image displayed on the second screen.

4. The input value setting assistance device according to claim 1, wherein the displaying the prescribed mark further comprises displaying the prescribed mark at a position indicated by the coordinate value in the image displayed on the second screen.

5. The input value setting assistance device according to claim 1, wherein the image and the setting field are without overlapping.

6. The input value setting assistance device according to claim 1, wherein the application represents a web application to be tested by automatically setting the input data to the input field of the plurality of input fields on the first screen during testing.

7. The input value setting assistance device according to claim 1, wherein the input field of the first screen and the setting field of the second screen are distinct.

8. The input value setting assistance device according to claim 1, the processor further configured to execute operations comprising:
   receiving input to one or more setting fields of the setting fields;
   specifying the input as the value in the input field of the plurality of input fields of the first screen;
   updating the first screen with a third screen of the application, wherein the third screen is based on the value in the input field of the plurality of input fields of the first screen;
   acquiring an image of the third screen and a coordinate value of each input field of a plurality of input fields in the third screen; and
   updating the second screen, wherein the second screen comprises the image of the third screen and setting fields associated with respective input fields in the third screen; and
   when a setting field of the setting fields associated with respective input fields in the third screen is interactively selected, updating, in the second screen, the prescribed mark and the indication of the selection of the setting field of the setting fields associated with the respective input fields in the third screen.

9. An input value setting assistance method, executed by a computer, comprising:
   displaying a first screen of an application, wherein the first screen comprises a plurality of input fields associated with the application;
   acquiring an image of the first screen and a coordinate value of each input field of the plurality of input fields in the first screen, wherein the coordinate value of each input field of the plurality of input fields in the first screen is according to an instruction code of displaying said each input field of the plurality of input fields in the first screen of the application;
   displaying a second screen, wherein the second screen comprises the image and setting fields, wherein the setting fields are interactively selectable for receiving input data for setting a value associated with an input field of the plurality of input fields; and
   when a setting field of the setting fields is interactively selected, displaying, in the second screen, a prescribed mark and an indication of the selection of the setting field,
      wherein a set of the prescribed mark and the indication of the selection of the setting field represents an assistance to enter the input data in the selected setting field by indicating association between the input field and the interactively selected setting field,
      the prescribed mark points to a part of the image corresponding to the acquired coordinate value of the input field of the plurality of input fields associated with the interactively selected setting field, and
      the prescribed mark and the indication of the selection of the setting field are distinct.

10. The input value setting assistance method according to claim 9, wherein the displaying the prescribed mark further comprises superimposing and displaying the prescribed mark on the image displayed on the second screen.

11. The input value setting assistance method according to claim 10, wherein the displaying the prescribed mark further comprises displaying the prescribed mark at a position indicated by the coordinate value in the image displayed on the second screen.

12. The input value setting assistance method according to claim 9, wherein the displaying the prescribed mark further comprises displaying the prescribed mark at a position indicated by the coordinate value in the image displayed on the second screen.

13. The input value setting assistance method according to claim 9, further comprising:
   receiving input to one or more setting fields of the setting fields;
   specifying the input as the value in the input field of the plurality of input fields of the first screen;
   updating the first screen with a third screen of the application, wherein the third screen is based on the value in the input field of the plurality of input fields of the first screen;
   acquiring an image of the third screen and a coordinate value of each input field of a plurality of input fields in the third screen; and
   updating the second screen, wherein the second screen comprises the image of the third screen and setting fields associated with respective input fields in the third screen; and
   when a setting field of the setting fields associated with respective input fields in the third screen is interactively selected, updating, in the second screen, the prescribed mark and the indication of the selection of the setting field of the setting fields associated with the respective input fields in the third screen.

14. A computer-readable non-transitory recording medium storing computer-executable program instructions that when executed by a processor cause a computer system to:
   display a first screen of an application, wherein the first screen comprises display of a plurality of input fields of the application;
   acquire an image of the first screen and a coordinate value of each input field of the plurality of input fields in the first screen, wherein the coordinate value of each input field of the plurality of input fields in the first screen is according to an instruction code of displaying said each input field of the plurality of input fields in the first screen of the application; and
   display a second screen, wherein the second screen comprises the image and setting fields, wherein the setting fields are interactively selectable for receiving input data for setting a value associated with an input field of the plurality of input fields; and
   when a setting field of the setting fields is interactively selected, display, in the second screen, a prescribed mark and an indication of the selection of the setting field,
      wherein a set of the prescribed mark and the indication of the selection of the setting field represents an assistance to enter the input data in the selected setting field, by indicating association between the input field and the interactively selected setting field,
      the prescribed mark points to a part of the image corresponding to the acquired coordinate value of the input field of the plurality of input fields associated with the interactively selected setting field, and the prescribed mark and the indication of the selection of the setting field are distinct.

15. The computer-readable non-transitory recording medium according to claim 14, wherein the displaying the prescribed mark further comprises superimposing and displaying the prescribed mark on the image displayed on the second screen.

16. The computer-readable non-transitory recording medium according to claim 15, wherein the displaying the prescribed mark further comprises displaying the prescribed mark at a position indicated by the coordinate value in the image displayed on the second screen.

17. The computer-readable non-transitory recording medium according to claim 14, wherein the displaying the prescribed mark further comprises displaying the prescribed mark at a position indicated by the coordinate value in the image displayed on the second screen.

18. The computer-readable non-transitory recording medium according to claim 14, the computer-executable program instructions when executed by the processor further cause the computer system to:

receive input to one or more setting fields of the setting fields;

specify the input as the value in the input field of the plurality of input fields of the first screen;

update the first screen with a third screen of the application, wherein the third screen is based on the value in the input field of the plurality of input fields of the first screen;

acquire an image of the third screen and a coordinate value of each input field of a plurality of input fields in the third screen; and update the second screen, wherein the second screen comprises the image of the third screen and setting fields associated with respective input fields in the third screen; and when a setting field of the setting fields associated with respective input fields in the third screen is interactively selected, update, in the second screen, the prescribed mark and the indication of the selection of the setting field of the setting fields associated with the respective input fields in the third screen.

* * * * *